(12) United States Patent
Lentz

(10) Patent No.: US 7,263,668 B1
(45) Date of Patent: Aug. 28, 2007

(54) DISPLAY INTERFACE TO A COMPUTER CONTROLLED DISPLAY SYSTEM WITH VARIABLE COMPREHENSIVENESS LEVELS OF MENU ITEMS DEPENDENT UPON SIZE OF VARIABLE DISPLAY SCREEN AVAILABLE FOR MENU ITEM DISPLAY

(75) Inventor: James Lee Lentz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1382 days.

(21) Appl. No.: 09/710,918

(22) Filed: Nov. 9, 2000

(51) Int. Cl.
*G06F 9/00* (2006.01)
(52) U.S. Cl. .................. 715/801; 715/800; 715/798; 715/760; 715/700
(58) Field of Classification Search ............... 715/801, 715/800, 798, 760, 700, 784, 781; 345/700, 345/798, 800, 760, 810
See application file for complete search history.

(56) References Cited

U.S. PATENT DOCUMENTS

| | | | | |
|---|---|---|---|---|
| 5,684,969 A | * | 11/1997 | Ishida ..................... | 345/800 |
| 5,956,709 A | * | 9/1999 | Xue ........................ | 707/3 |
| 6,266,684 B1 | * | 7/2001 | Kraus et al. ............. | 715/513 |
| 6,456,305 B1 | * | 9/2002 | Qureshi et al. .......... | 345/800 |

* cited by examiner

*Primary Examiner*—Kristine Kincaid
*Assistant Examiner*—Peng Ke
(74) *Attorney, Agent, or Firm*—Jerry B. Kraft; Mark S. Walker

(57) ABSTRACT

A display interface system for computer controlled displays including a window in a display screen, for the display of visible data; a set of selectable items in the portion of said display screen; an implementation for varying the area of the display screen portion; and for varying the comprehensiveness level of the items in response to the varying area of the display screen portion. It is often the case that the area in a window needs to be reduced for any of a variety of purposes. In such a situation, the items in the menu are maintained at a high level of comprehensiveness, e.g. icon plus explanatory text, while its window area is greatest. Then, as the window area is reduced, the levels of comprehensiveness of the items in the menu or set are also reduced since the space can no longer accommodate them.

21 Claims, 8 Drawing Sheets

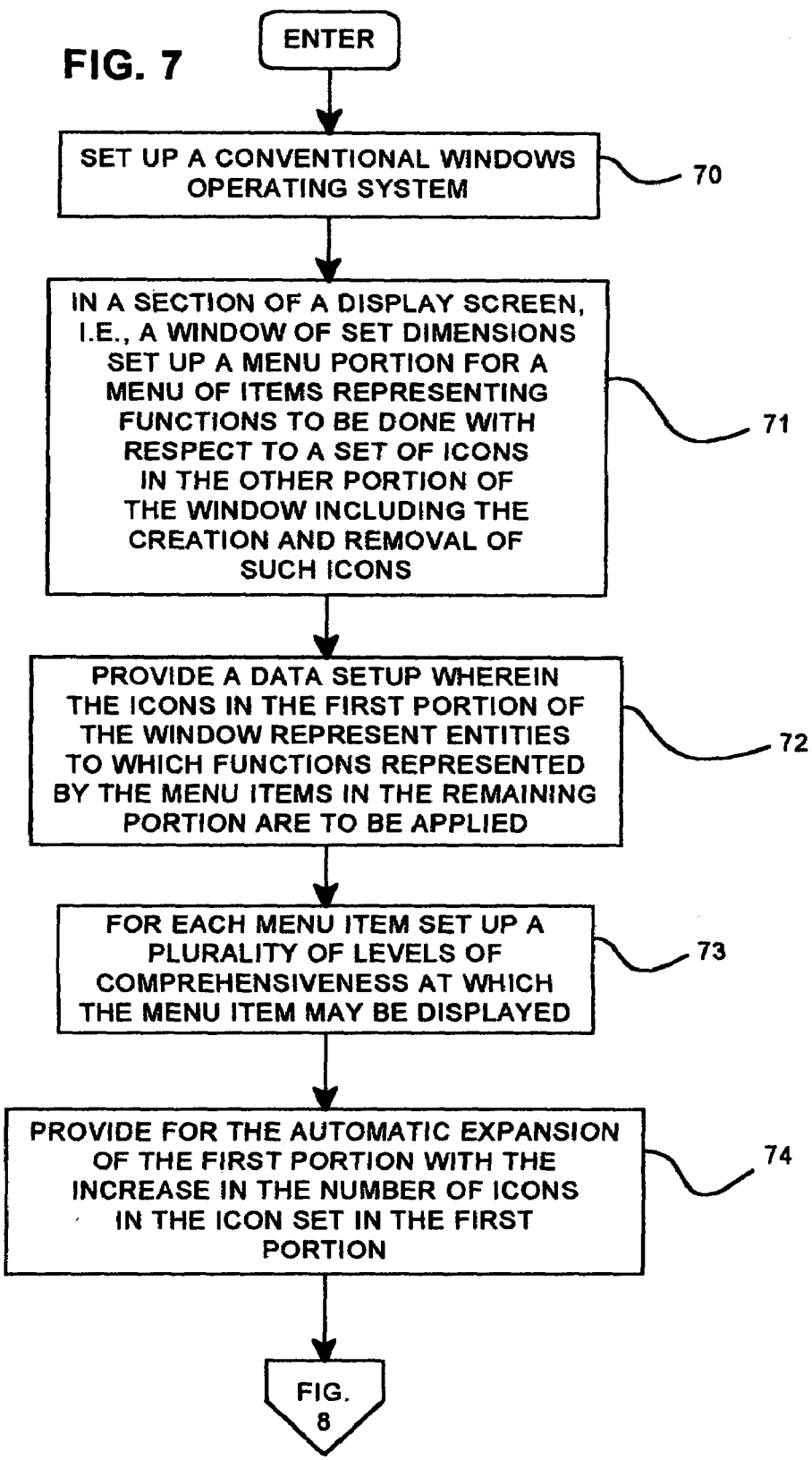

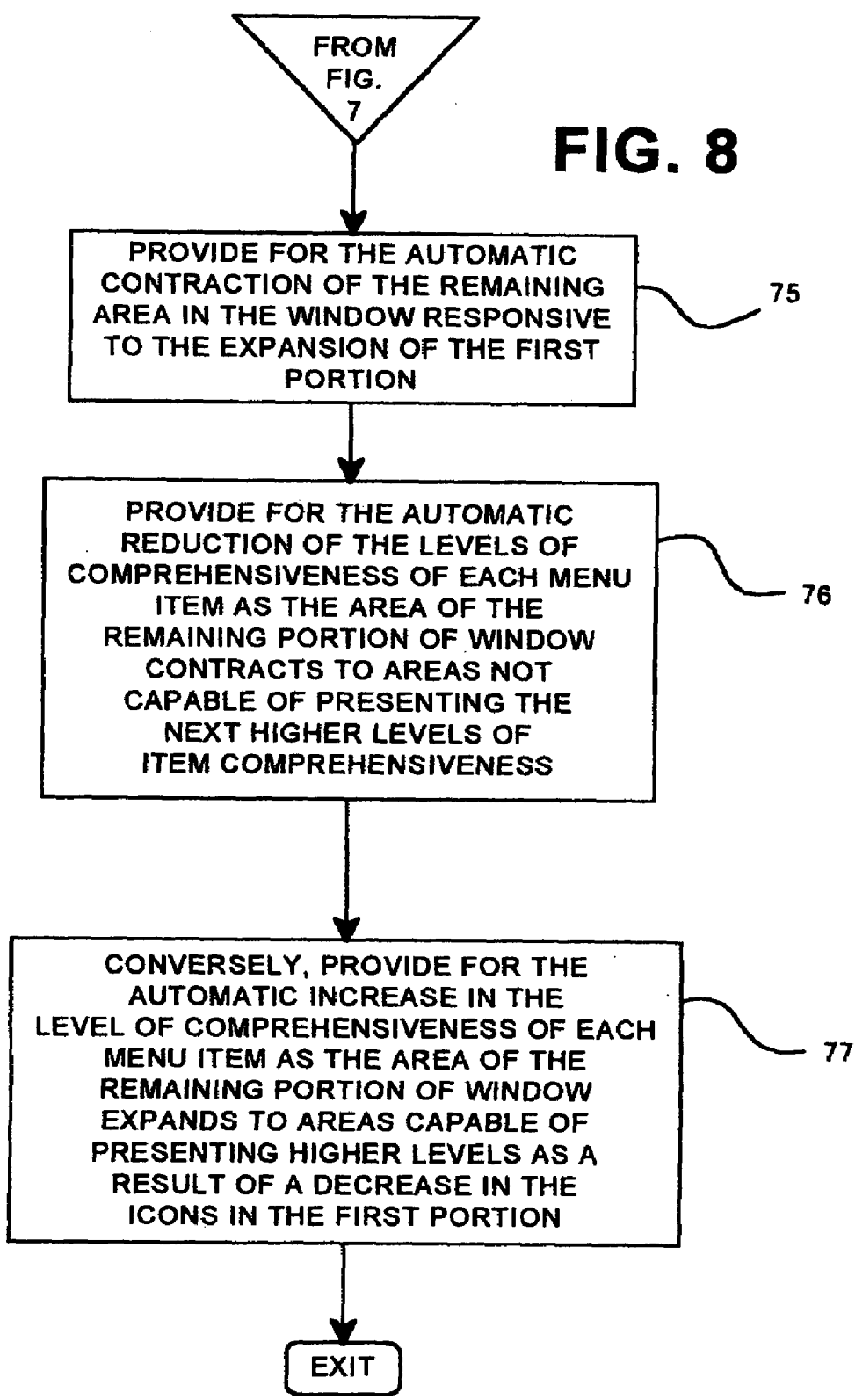

DISPLAY INTERFACE TO A COMPUTER CONTROLLED DISPLAY SYSTEM WITH VARIABLE COMPREHENSIVENESS LEVELS OF MENU ITEMS DEPENDENT UPON SIZE OF VARIABLE DISPLAY SCREEN AVAILABLE FOR MENU ITEM DISPLAY

TECHNICAL FIELD

The present invention relates to user interactive computer supported display technology and particularly to graphical user interfaces which are user friendly and provide interactive users with an interface environment which is easy to use.

BACKGROUND OF RELATED ART

The past decade has been marked by a technological revolution driven by the convergence of the data processing industry with the consumer electronics industry. This advance has been even further accelerated by the extensive consumer and business involvement in the Internet over the past two years. As a result of these changes, it seems as if virtually all aspects of human endeavor in the industrialized world require human-computer interfaces. There is a need to make computer directed activities accessible to a substantial portion of the world's population which, up to a few years ago, was computer-illiterate or, at best, computer indifferent. In order for the vast computer supported marketplace to continue and be commercially productive, it will be necessary for many computer indifferent consumers and other potential users to be involved in computer interfaces.

Two of the computer interface implementations which have played a major role in advancing user interfaces have been: display windows, which make it possible for the user to simultaneously conduct many operations and sessions; and icons, which make user interaction with the computer more intuitive and quicker.

These two implements, which usually function together, do have limitations, which also affect each other. Because of the increase in functions which may be carried out in windows, the number of windows and their respective scopes on a display screen have increased. As a result, the available area within individual windows may often be limited. On the other hand, while icons and like interactive images may be intuitive, easy to access and fast, they often require a learning period to permit the user to learn the functions which they represent. During any such learning period, it is desirable to have explanatory text associated with each selectable icon or image item in a selectable set or menu. The above-described limitations in available window area work against such explanatory text to make each selectable item more comprehensive and understandable.

Currently available user interface systems have features for customizing user interfaces based upon the degree of comprehensiveness required by the user at his particular skill level. However, such customization implementations require the user to locate the interface customization feature and then proceed through several steps in the feature, e.g. he must locate the appropriate menu, interpret his preferences within the menu and find appearance options within appropriate dialogs. As will be seen hereinafter, the present invention eliminates such customization steps and thereby provides for an automatic customization within the operative window.

SUMMARY OF THE PRESENT INVENTION

The present invention provides a user friendly display interface system for computer controlled displays for solving the above-described problems by maximizing the amount of time that selectable items in an interactive display set or menu may be displayed at a higher level of comprehensiveness. The system, program and method includes means for providing a portion, i.e. a window in a display screen for the display of visible data; means for displaying a set of selectable items in the portion of said display screen; means for varying the area of said display screen portion; and means for varying the comprehensiveness level of said items in response to the varying area of said display screen portion. It is often the case that the area in a window needs to be reduced for any of a variety of purposes. In such a situation, the items in the menu are maintained at a high level of comprehensiveness, e.g. icon plus explanatory text, while its window area is greatest. Then, as the window area is reduced, the levels of comprehensiveness of the items in the menu or set are also reduced since the space can no longer accommodate them. The comprehensiveness of the items may be reduced through several levels until a level is reached when the space in the window is so limited that the menu or set of images or icons is at an image only display with no explanatory text. Conversely, should the window or display portion area be expanded again, then the comprehensiveness of the items in the menu or set may be correspondingly increased through the several levels. In this manner, the user is exposed to the higher levels of menu item comprehensiveness for the maximum period of time.

While the present invention is being illustrated with menu items including images or icons, the principles of the invention are also applicable to alphanumeric items. For example, the items may be single word terms such as "Route", "Fetch" or "Split" at the levels of lowest comprehensiveness and accompanied by explanatory text at higher levels.

In accordance with a more particular aspect of the present invention, the invention is applied to a display screen window having a first portion in which data is to be displayed and a remaining portion for the presentation of a menu of items selectable to perform functions relative to the data in the first portion including changing the content and extent of the visible data in the first portion. The system of the invention comprises means for providing a first portion of a display screen window for the display of visible data; means for providing in the remaining portion of the display screen window a menu of items selectable to produce the visible data in said first portion; means for varying the area of said remaining portion of the display screen window responsive to the visible data area requirements of the first portion; and means for varying the comprehensiveness level of the items in the menu in response to the varying area of the remaining portion. The visible data in the first portion may include images such as icons.

Furthermore, the system may operate with means for automatically varying the area of the first portion in response to changes in the visible data content in the first portion; and the said means for varying the comprehensiveness level of the items in the menu is automatically responsive to the means for varying the area of said first portion.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIGS. 7 and 8 are a flowchart of the program steps involved in setting up an implementation for presentation of an interactive menu of items of variable levels of comprehensiveness according to the present invention.

DETAILED DESCRIPTION OF THE PREFERRED EMBODIMENT

Figure 1:
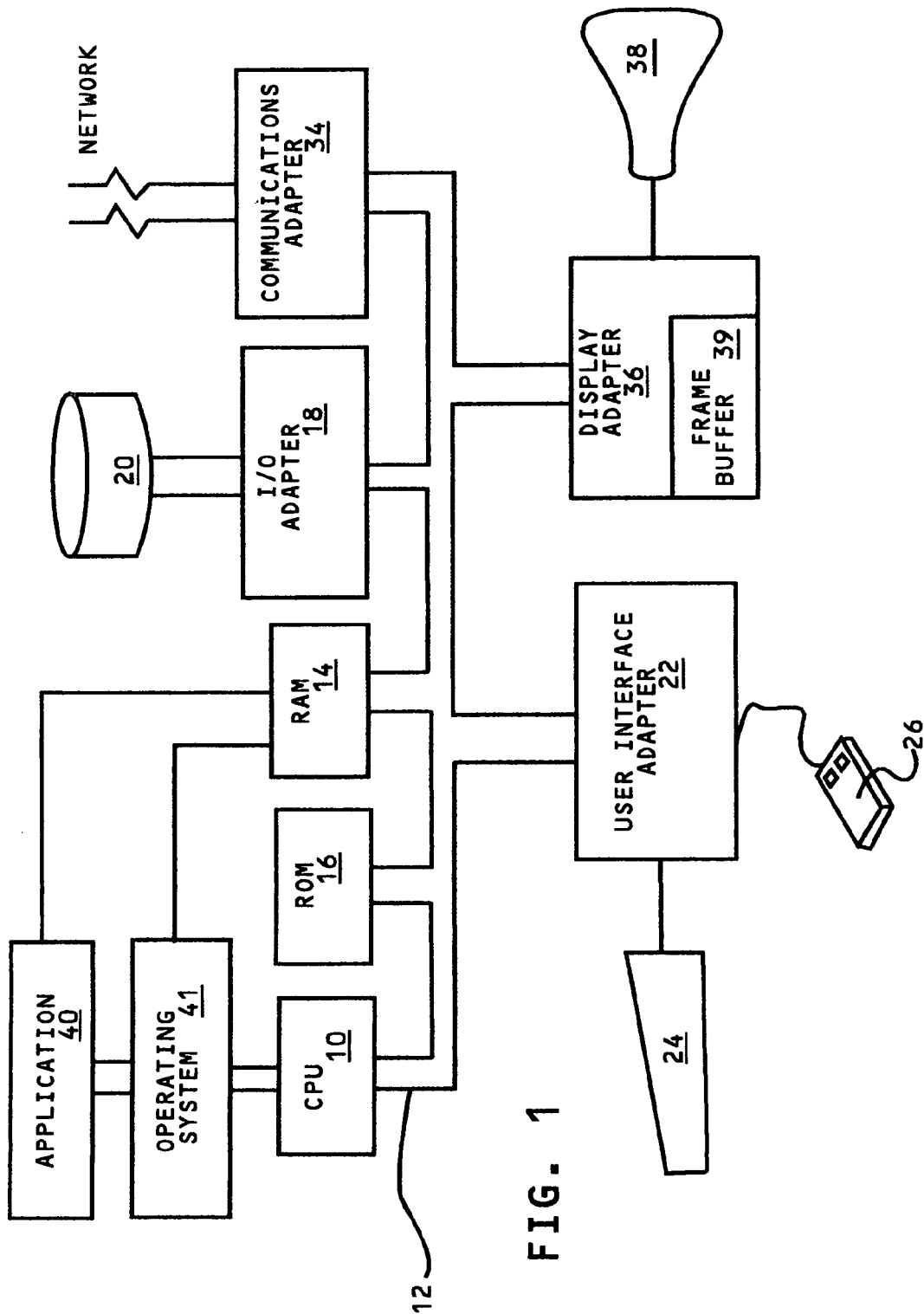
FIG. 1 is a block diagram of an interactive data processor controlled display system including a central processing unit which is capable of implementing the presentation of an interactive menu of items of variable levels of comprehensiveness according to the present invention.

Referring to FIG. 1, a typical data processing system is shown which may function as the computer controlled display terminal used to implement the presentation of an interactive displayed menu of items of variable levels of comprehensiveness. A central processing unit (CPU) 10, such as one of the PC microprocessors, distributed by International Business Machine Corporation (IBM), or workstations, e.g. RISC System/6000™ (RS/6000) (RISC System/6000 is a trademark of IBM) series available from IBM as provided and interconnected to various other components by system bus 12. An operating system 41 runs on CPU 10, provides control and is used to coordinate the function of the various components of FIG. 1. Operating system 41 may be one of the commercially available windows type of operating systems such as IBM's AIX 6000™ operating system of Microsoft's Windows98™ or WindowsNT™, as well as the UNIX and AIX operating systems. Application programs 40, controlled by the system, are moved into and out of the main memory, Random Access Memory (RAM), 14. These programs include the program of the present invention to be subsequently described to provide displayed menus of items of variable levels of comprehensiveness. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. It should be noted that software components, including the operating system 41 and the application 40, are loaded into RAM 14, which is the computer system's main memory. I/O adapter 18 may be a small computer system adapter that communicates with the disk storage device 20, i.e. a hard drive. Communications adapter 34 interconnects bus 12 with an outside network enabling the data processing system to communicate with other such systems. In present day systems, windowed data may be transmitted from other computer stations in a network, such as the Internet.

I/O devices are also connected to system bus 12 via user interface adapter 22 and display adapter 36. Keyboard 24 and mouse 26 are connected to bus 12 through user interface adapter 22. It is through such input devices that the user interactive functions involved in the displays of the present invention may be implemented. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. As previously mentioned, in order to accommodate the hierarchies of overlapping and hidden windows, the frame buffer 39 should be a depth buffer; for example, the depth buffer of U.S. Pat. NO. 5,241,565. By using the aforementioned I/O devices, a user is capable of inputting information to the system through the keyboard 24 or mouse 26 and receiving output information from the system via display 38.

Figure 2:
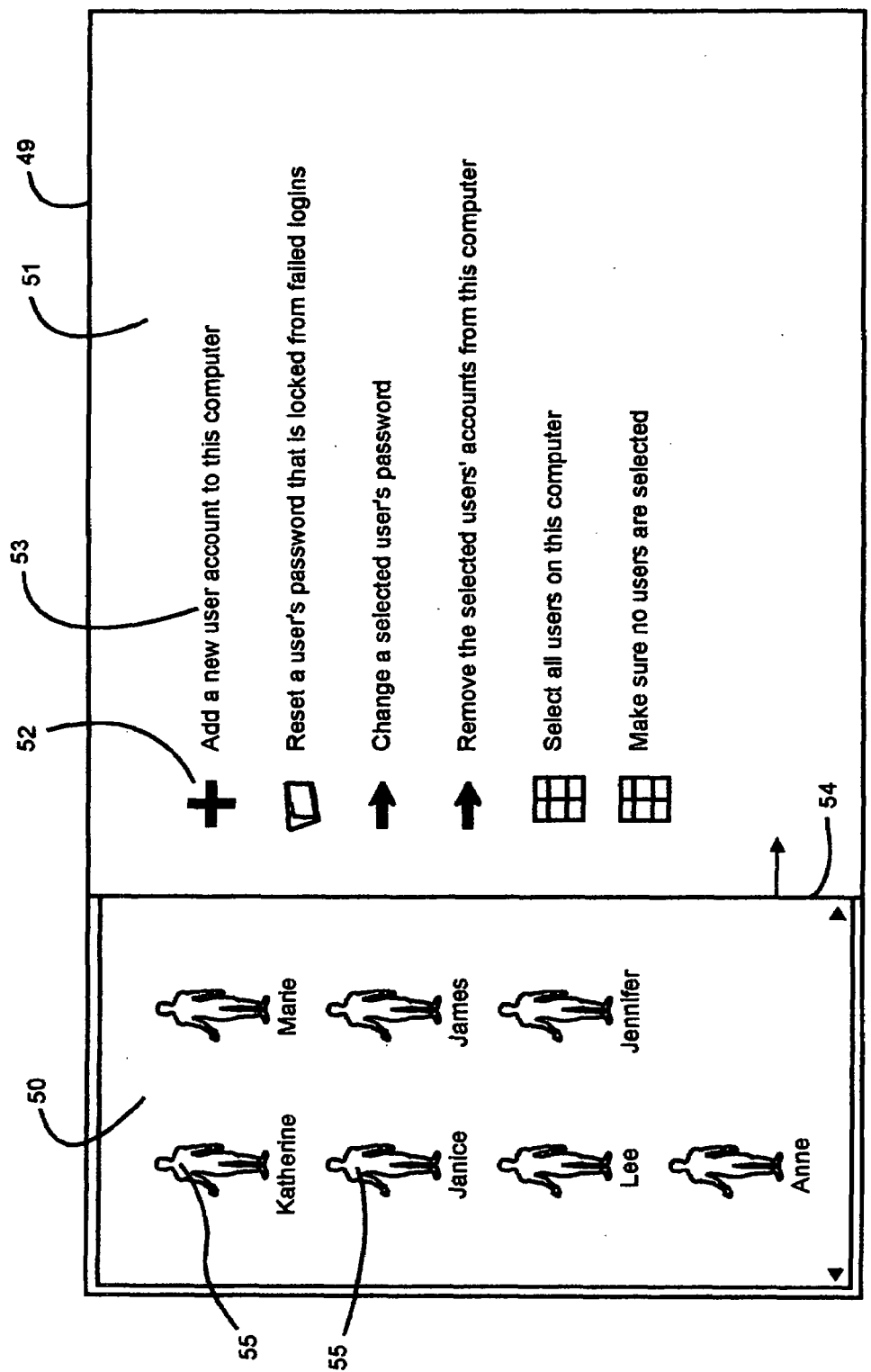
FIG. 2 is a diagrammatic view of a display screen window with a first portion of visible data and a remaining portion presenting a menu of items at the highest level of comprehensiveness.
Figure 3:
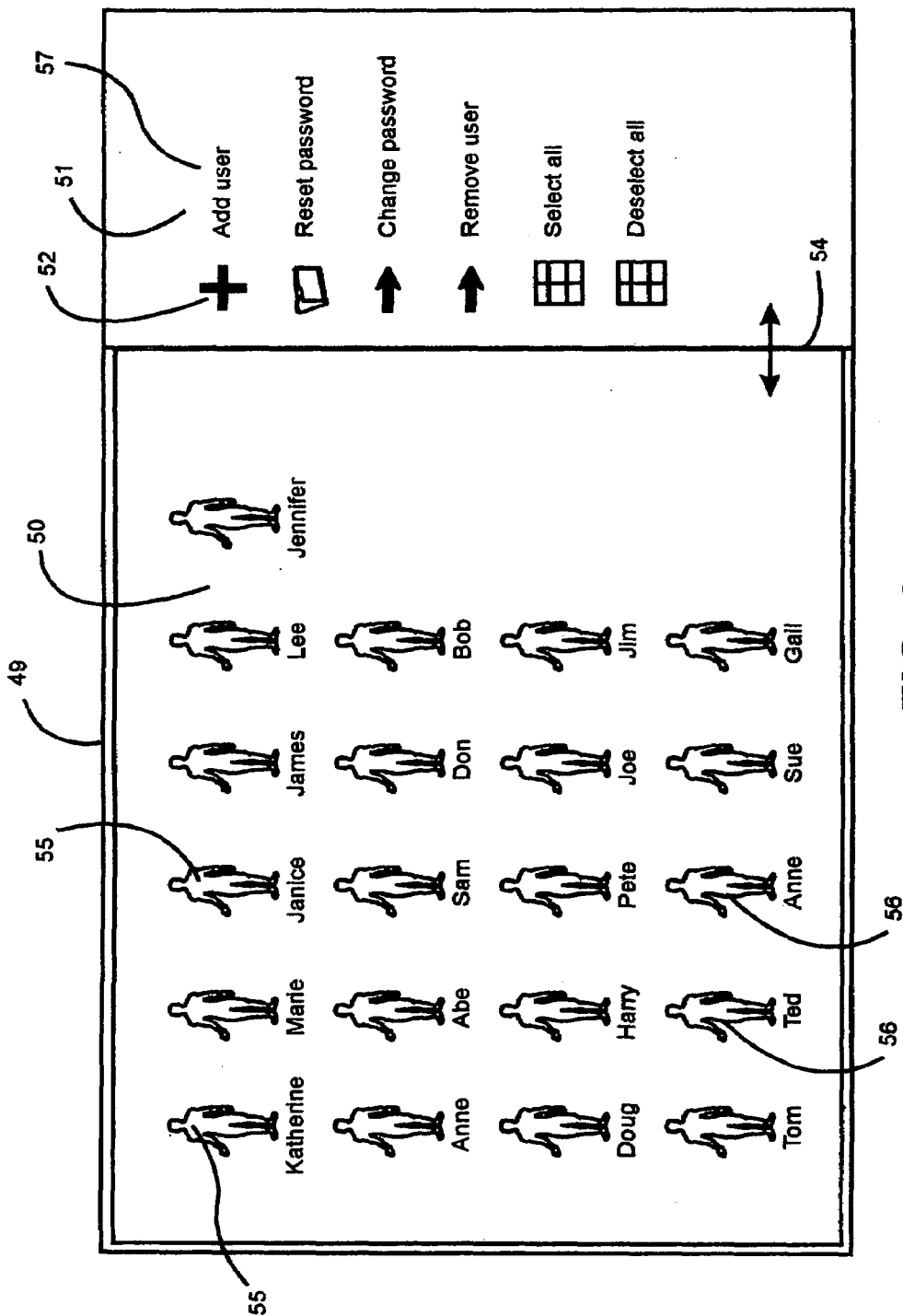
FIG. 3 is the diagrammatic view of FIG. 2 but with a first portion of expanded are a resulting in a remaining portion with a menu at an intermediate level of comprehensiveness.
Figure 4:
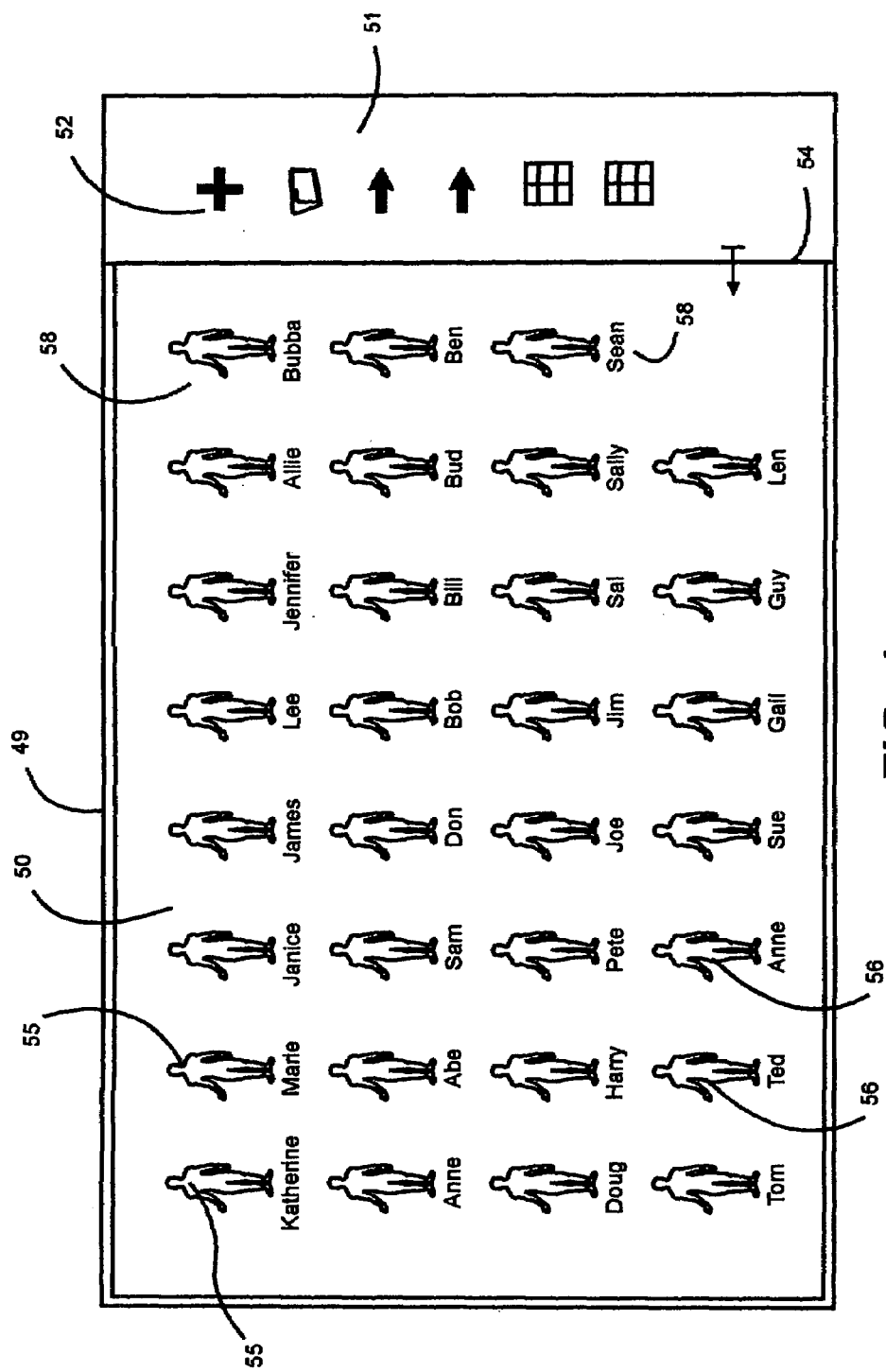
FIG. 4 is the diagrammatic view of FIG. 3 but with a first portion of maximum expanded are a resulting in a remaining portion with a menu at the lowest level of comprehensiveness.

There will now be described some simple illustrations of the present invention with respect to the display screens of FIGS. 2 through 6. When the screen images are described, it will be understood that these may be rendered by storing image and text creation programs, such as those in any conventional window operating system in the RAM 14 of the system of FIG. 1. The operating system is diagrammatically shown in FIG. 1 as operating system 41. The display screens of FIGS. 2 through 4 are presented to the viewer on display monitor 38 of FIG. 1. In accordance with conventional techniques, the user may control the screen interactively through a conventional I/O device, such as mouse 26 of FIG. 1, which operates through user interface 22 to call upon programs in RAM 14 cooperating with the operating system 41 to create the images in frame buffer 39 of display adapter 36 to control the display on monitor 38.

With reference to FIG. 2, a window 49 on a display screen has two portions: first portion 50 which includes visible data which may be image and/or alphanumeric text, which in the present example are icons with names 55. The remaining portion, 51, of the window separated from the first portion 50 by linear boundary 54 contains an interactive menu of selectable items. Each item on the menu includes a selectable icon 52 and text 53 advising the user of the function which the selection of the icon will cause to be performed on the entities represented by data, e.g. people icons in first portion 50. In the window of FIG. 2, the menu items made up of icons 52 and text 53 give the most descriptive details about each item's function, and are, thus, at the highest level of comprehensiveness. However, as the data content in the first portion 50 of the window increases, which in the present case are people icons 55 and now people icons 56 (FIG. 3), a point is reached where the data content exceeds the display capacity of first portion 50. At this point, boundary 54 will shift to the point shown in FIG. 3 to thereby decrease the area of remaining portion 51 so that the text 57 now associated with each icon 52 in each menu item is shortened, whereby the description of icons 52 in the menu item is much more limited. Thus, the level of comprehensiveness of the menu items is at a lower, i.e. intermediate, level. The visible data in first portion 50 continues to expand with the addition of new icons. Note, new icons, such as icons 58 in FIG. 4, may be added to the first portion 50 through the "Add User" menu item. When the data content in the first portion 50 in FIG. 3 fills the first portion, the boundary 54 shifts to the position shown in FIG. 4 where the menu of items 52 is at the "icons only" level which is the lowest level of comprehensiveness. However, the user has had the opportunity to have worked with menu items of higher levels of comprehensiveness during the transitions described with respect to FIGS. 2 through 4 may now be more familiar and comfortable working with icons alone. It should also be noted that if the data content in first portions 50 is reduced by the removal of people icons so that the capacities of visible data in portions falls below the area of FIG. 3 or even FIG. 2, then the levels of comprehensiveness of the menu items may correspondingly be increased to the levels of FIG. 2 or FIG. 3.

In the description relative to FIGS. 2 through 4, for simplicity of illustration the data content of first portion 50 has been shown to be dependent primarily on the number of people icons or objects 56 within portion 50. It will be understood that increases in the data content could be made without increasing the number of icons or objects 56. For example, more details may be displayed for each of the icons or objects 56.

Figure 5:
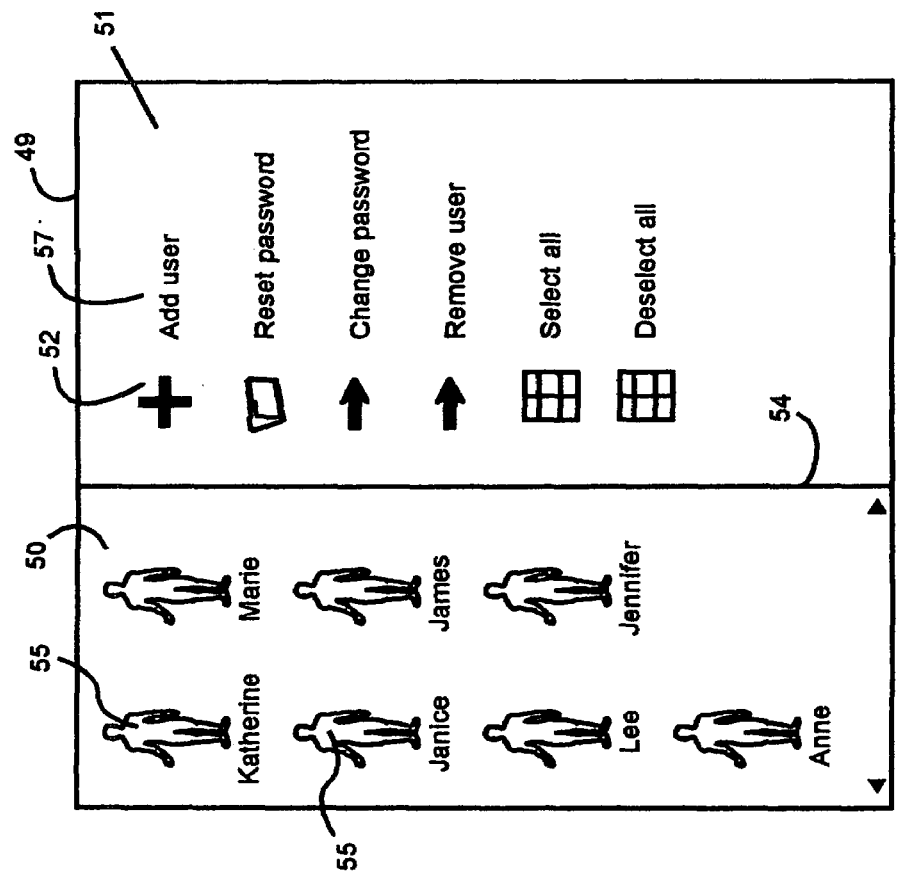
FIG. 5 is the diagrammatic view of FIG. 2 but with the whole window reduced in area resulting in a remaining portion with a menu at an intermediate level of comprehensiveness.

In one variation of the present invention, the whole window 49 of FIG. 2 may be reduced in area, first to the size shown in FIG. 5 while the size of the first portion 50 remains unchanged. Thus, the remaining portion 51 is reduced to a size about equal to the size of remaining portion 51 in FIG. 3. As a result, the text 57 now associated with each icon 52 in each menu item is shortened whereby the description of icons 52 in the menu item is much more limited. Thus, as in FIG. 3, the level of comprehensiveness of the menu items is at a lower, i.e. intermediate, level. Then, as the area window 49 is further reduced, while the area of the first portion 50 remains unchanged, the remaining portion 51 is further reduced to a size about equal to the size of the remaining portion 51 in FIG. 4 where the menu of items 52 is at the "icons only" level, which is the lowest level of comprehensiveness.

Figure 6:
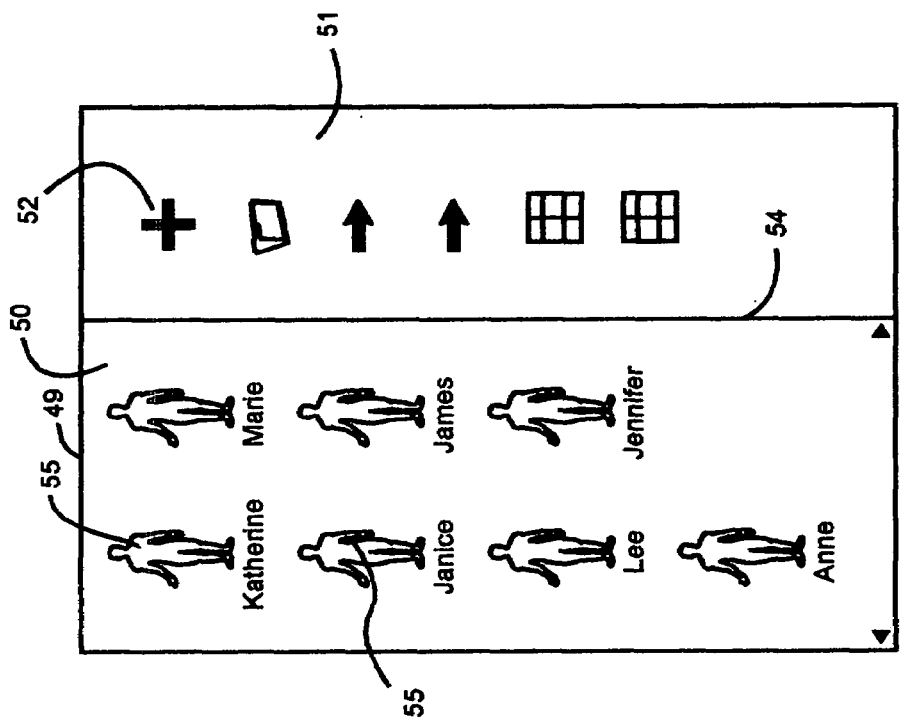
FIG. 6 is the diagrammatic view of FIG. 5 but with the whole window further reduced in area resulting in a remaining portion with a menu at lowest level of comprehensiveness.

Now, with reference to FIGS. 7 and 8 there will be described a process implemented by a program according to the present invention for dynamically changing the area of the window portion displaying a menu of items and for changing the levels of comprehensiveness of the menu items responsive to the changing area. The program routines, which are created by the process of FIGS. 7 and 8, implement the operations described with respect to FIGS. 2 through 6. In the flowchart of FIG. 6, a basic type operating system is set up, step 70, using any operating system for managing a hierarchy of windows, e.g. Windows98™, and Motif for Unix or AIX. Then, a process is provided for setting up and maintaining in a section of a display screen a window of set dimensions having a menu portion for the display of a menu of items representing functions to be done with respect to a set of icons in the other portion of the window, step 71. These menu functions include the creation and removal of such icons. The data set up is such that the icons in the portion, which are referred to as the first portion, represent entities to which functions represented by the menu items are to be applied, step 72. The menu portion will be referred to as the remaining portion. For each of the items in the menu, there is set up a plurality of levels of comprehensiveness at which the menu item may be displayed, step 73. A process is provided for the automatic expansion of the first portion as the number of icons in the icon set in the first portion increases, step 74. A process is also provided for the automatic contraction of the remaining portion area in response to the expansion of the first portion, step 75, FIG. 8. A routine is provided for the automatic reduction of the levels of comprehensiveness of each menu item as the area of the remaining portion of the window contracts to area sizes not capable of presenting the next higher levels of menu item comprehensiveness, step 76.

Also, conversely, processes are set up for the automatic reduction of the first portion as the number of icons in the icon set in the first portion decreases, and a process is also provided for the automatic expansion of the remaining portion area in response to the contraction of the first portion. Consequently, a routine is provided for the automatic increase of the levels of comprehensiveness of each menu item as the area of the remaining portion of the window expands to area sizes capable of presenting the higher levels of menu item comprehensiveness in response to the expanded remaining portion area, step 77.

Figure 9:
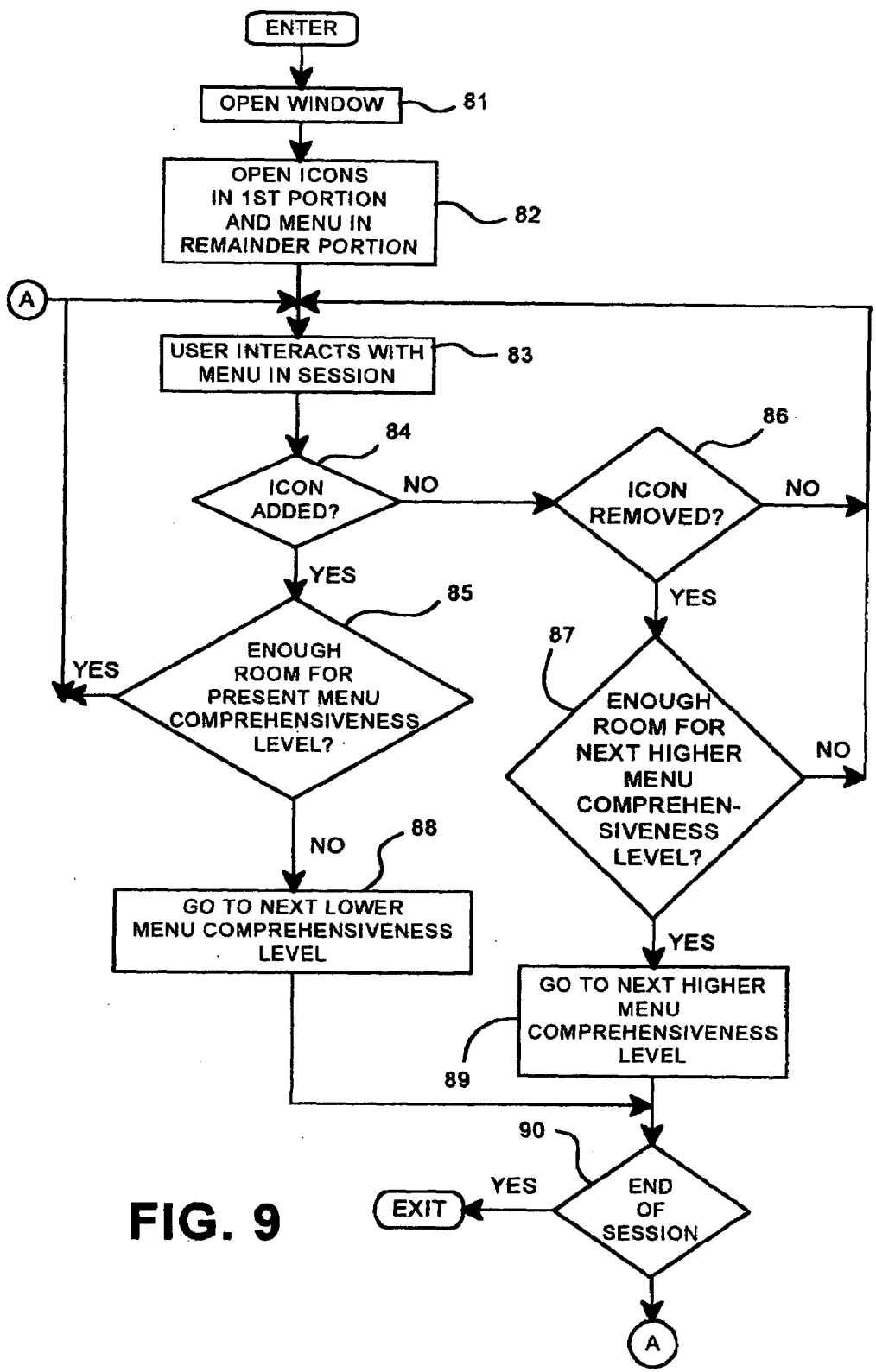
FIG. 9 is a flowchart of an illustrative running of the steps set up in the program of FIGS. 7 and 8.

Now that the setting up of the basic program has been described and illustrated, there will be described with respect to FIG. 9 a flowchart of a simple operation showing how the program could be run. The window of FIG. 2 is opened, step 81, in which image data, such as icons, are in a first portion of the window and the menu of items is in the remaining portion of the window, step 82. The user is enabled to interact with the window to perform functions selected from the menu in the remaining portion with respect to the entities represented by the icons in the first portion, including the addition and deletion of icons representative of such entities, step 83. A determination is made, step 84, as to whether an icon has been added. If Yes, then a further determination is made, step 85, as to whether the addition of the icon has resulted in an expansion of the first portion and a consequent reduction in the area of the remaining portion so that there is still enough room in the remaining portion to maintain menu item comprehensiveness at the present level. If Yes, then the process is returned to step 83 and the user interaction continues. If No, there is no longer enough room, then the menu item comprehensiveness is reduced to the next lower level at which less room of the remaining portion is required, step 88. On the other hand, if the determination back at step 84 was No icon added to first portion, then a determination is made as to whether an icon has been removed from the first area, step 86. If Yes, then a further determination is made, step 87, as to whether the removal of the icon has resulted in a reduction of the first portion and a consequent expansion in the area of the remaining portion to that there is now enough room in the remaining portion to expand to menu item comprehensiveness at the next higher level. If No, then the process is returned to step 83 and the user interaction continues. If Yes, there is enough room for expansion, then the menu item comprehensiveness is increased to the next higher level which requires more room in the remaining portion, step 89. On the other hand, if the determination back at step 86 was No icon removed from the first portion, then a determination is made as to whether an icon has been removed from the first area, step 86, then the process is returned to step 83 and the user interaction continues. After steps 88 or 89, a determination may conveniently be made as to whether the session is at an end, step 90. If Yes, the session is exited. If No, then the process is returned to step 83 and the user interaction continues.

It should be noted that the programs covered by the present invention may be stored outside of the present computer systems until they are required. The program instructions may be stored in another readable medium, e.g. in disk drive associated with the desktop computer or in a removable memory, such as an optical disk for use in a CD ROM computer input or in a floppy disk for use in a floppy disk drive computer input. Further, the program instructions may be stored in the memory of another computer prior to use in the system of the present invention and transmitted over a network, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

The invention claimed is:

1. A system for providing a user interactive display interface in a computer controlled display comprising:
   means for providing a first portion of a display screen window for the display of visible data;
   means for providing in the remaining portion of the display screen window a menu of items selectable to produce said visible data in said first portion;
   means for varying the area of said remaining portion of said display screen window responsive to the visible data area requirements of said first portion; and
   means for varying the data content level of each of the items in said menu in response to the varying area of said remaining portion.

2. The system of claim 1 wherein said visible data includes images.

3. The system of claim 2 wherein said visible data includes icons.

4. The system of claim 2 further including:
   means for automatically varying the area of said first portion in response to changes in the visible data content in said first portion; and
   wherein said means for varying the data content level of each of the items in said menu is automatically responsive to said means for varying the area of said first portion.

5. The system of claim 4 wherein said visible data includes icons.

6. The system of claim 4 wherein said means for varying the data content level provides a higher level of data content wherein each of said menu items includes text.

7. The system of claim 6 wherein said means for varying the data content level provides a lower level of data content wherein each of said menu items includes only icons.

8. A method for providing a user interactive display interface in a computer controlled display comprising:
   providing a first portion of a display screen window for the display of visible data;
   providing in the remaining portion of the display screen window a menu of items selectable to produce said visible data in said first portion;
   varying the area of said remaining portion of said display screen window responsive to the visible data area requirements of said first portion; and
   varying the data content level of each of the items in said menu in response to the varying area of said remaining portion.

9. The method of claim 8 wherein said visible data includes images.

10. The method of claim 9 wherein said visible data includes icons.

11. The method of claim 9 further including the step of:
    automatically varying the area of said first portion in response to changes in the visible data content in said first portion; and
    wherein said step of varying the data content level of the items in said menu is automatically responsive to said step of varying the area of said first portion.

12. The method of claim 10 wherein said visible data includes icons.

13. The method of claim 10 wherein said step of varying the data content level provides a higher level of data content wherein each of said menu items includes text.

14. The method of claim 13 wherein said step of varying the data content level provides a lower level of data content wherein each of said menu items includes only icons.

15. A computer program having code recorded on a computer readable medium for providing a user interactive display interface in a computer controlled display comprising:
    means for providing a first portion of a display screen window for the display of visible data;
    means for providing in the remaining portion of the display screen window a menu of items selectable to produce said visible data in said first portion;
    means for; and
    means for varying the data content level of each of the items in said menu in response to the varying area of said remaining portion.

16. The computer program of claim 15 wherein said visible includes images.

17. The computer program of claim 16 wherein said visible data includes icons.

18. The computer program of claim 16 further including:
    means for automatically varying the area of said first portion in response to changes in the visible data content in said first portion; and
    wherein said means for varying the data content level of the items in said menu is automatically responsive to said means for varying the area of said first portion.

19. The computer program of claim 18 wherein said visible data includes icons.

20. The computer program of claim 18 wherein said means for varying the data content level provides a higher level of data content wherein each of said menu items includes text.

21. The computer program of claim 20 wherein said means for varying the data content level provides a lower level of data content wherein each of said menu items includes only icons.

* * * * *